United States Patent [19]

Kurakake et al.

[11] Patent Number: 5,237,656
[45] Date of Patent: Aug. 17, 1993

[54] IMAGE PROCESSING APPARATUS USING LOOK-UP TABLES

[75] Inventors: Mitsuo Kurakake; Shouichi Ootsuka; Yutaka Muraoka, all of Tokyo, Japan

[73] Assignee: Fanuc Ltd., Minamitsuru, Japan

[21] Appl. No.: 478,745

[22] PCT Filed: Apr. 30, 1987

[86] PCT No.: PCT/JP87/00270
§ 371 Date: Dec. 17, 1987
§ 102(e) Date: Dec. 17, 1987

[87] PCT Pub. No.: WO87/06741
PCT Pub. Date: Nov. 5, 1987

Related U.S. Application Data

[63] Continuation of Ser. No. 140,259, Dec. 17, 1987, abandoned.

[30] Foreign Application Priority Data

Apr. 30, 1986 [JP] Japan ................................ 61-100341

[51] Int. Cl.⁵ ............................................. G06F 15/66
[52] U.S. Cl. .................................. 395/164; 364/769; 340/750
[58] Field of Search ...................... 364/521, 522, 769; 340/750, 799; 395/164

[56] References Cited

U.S. PATENT DOCUMENTS 4,709,231 11/1987 Sakabara et al. ............... 364/522 X

FOREIGN PATENT DOCUMENTS 58-1275   1/1983  Japan .
59-132067 7/1984  Japan .

Primary Examiner—David L. Clark
Attorney, Agent, or Firm—Staas & Halsey

[57] ABSTRACT

An image processing apparatus is constructed by providing in parallel a plurality of dyadic look-up tables (10, 20) to which plural items of image data (I1, I2) read out of respective image memories (40, 50) are inputted. The dyadic look-up tables output data corresponding to a prescribed function, and provide this data to an image arithmetic (30) unit, which executes an operation corresponding to the prescribed function.

2 Claims, 1 Drawing Sheet

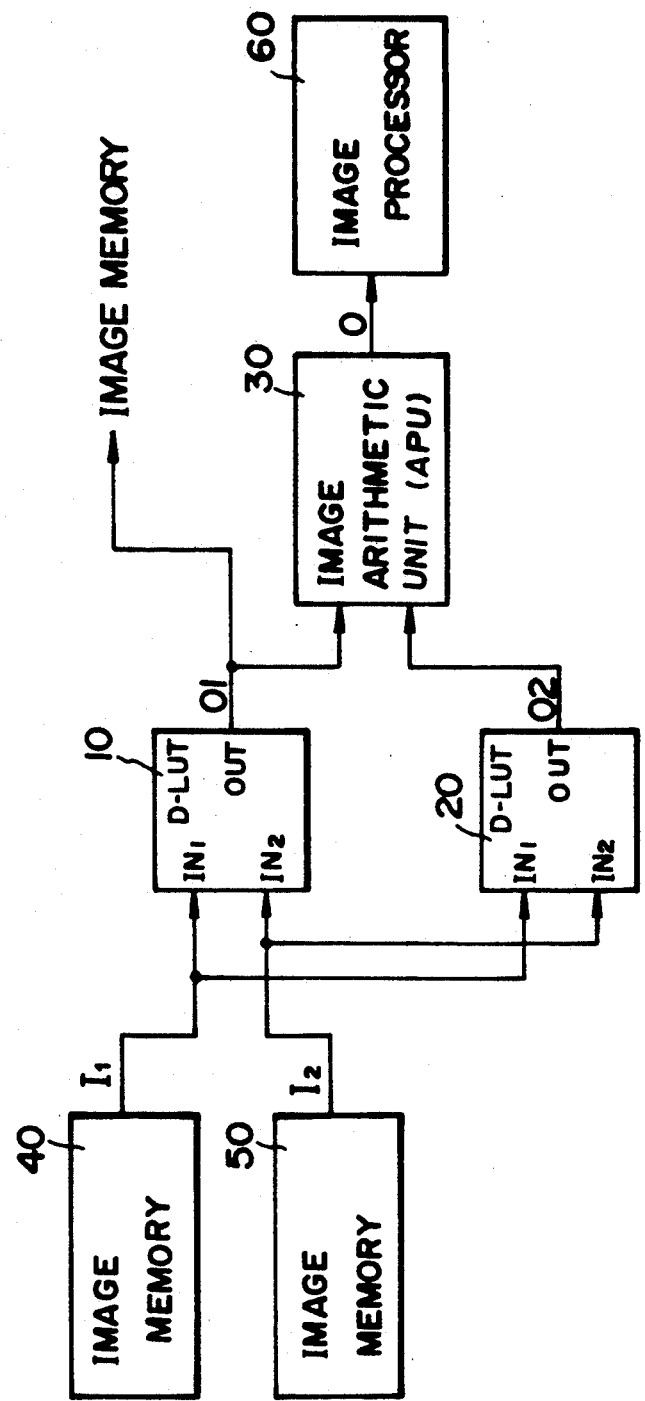

IMAGE PROCESSING APPARATUS USING LOOK-UP TABLES

This is a continuation of co-pending application Ser. No. 07/140,259, filed on Dec. 17, 1987.

BACKGROUND OF THE INVENTION

This invention relates to an image processing apparatus and, more particularly, to an image processing apparatus capable of executing operations between images at high speed.

BACKGROUND OF THE INVENTION

In various types of image processing for varying picture contrast or extracting the characteristics of an image, a look-up table (LUT) capable of executing image processing simply and at high speed is conventionally used.

The look-up table consists primarily of a RAM, in which the image data of each pixel is inputted as an address. The result of an operation in accordance with a prescribed function in which the address value serves as a variable is stored in each storage area in advance, with the results of the operation being output as data.

When an operation is performed between two images, a dyadic look-up table (D-LUT) is used. The input side of this look-up table is divided into an upper order address input and a lower order address input, and the image data of each pixel of the two images are applied to respective ones of the inputs. The result of an operation in accordance with a prescribed function for the two inputs is stored at an address in which the higher order and lower order addresses are serially connected. For example, if the upper order address is $A_U$, the lower order address is $A_L$ and the function is $f(x,y)$, then an operational result $f(A_U, A_L)$, which is obtained when $x = A_U$, $y = A_L$ hold, is stored at an address $[A_U A_L]$.

For a simple computation such as an arithmetic operation, the operation can be completed in a single cycle by using a look-up table (LUT) or dyadic look-up table (D-LUT). However, when an item of image data of one image is a variable I1 and an item of image data of the other image is a variable I2, an operation $I1^2 - I2^2$ neccessary for comparison processing must be executed over several processing cycles by a look-up table which performs a computation for squaring the inputs, a subtracter and a memory device for temporarily storing intermediate operational results. Consequently, operations cannot be performed at high speed.

SUMMARY OF THE INVENTION

The present invention has been devised in view of the foregoing drawback of the prior art and an object is to provide an image processing apparatus capable of speeding up processing by enabling execution of operations in a few processing cycles even if the operations between images are complicated.

An image processing apparatus capable of high-speed operations is constructed by providing in parallel a plurality of dyadic look-up tables to which plural items of image data I1, I2 are input as upper order addresses and lower order addresses. The image processing apparatus provides output data $f(I1,I2)$ corresponding to a prescribed function from an address $[I1I2]$. An arithmetic unit, which executes an operation corresponding to the prescribed function is connected to the output of each of the dyadic look-up tables.

BRIEF DESCRIPTION OF THE DRAWING

FIG. 1 is a block diagram illustrating an image processing apparatus according to an embodiment of the invention.

DESCRIPTION OF THE PREFERRED EMBODIMENT

An image processing apparatus in accordance with the invention is equipped with two dyadic look-up tables (D-LUT) 10, 20 each a RAM. The dyadic look-up tables 10, 20 each have a first input IN1 for an upper order address input, a second input IN2 for a lower order address input, and a data output OUT.

Assuming that image data input to the first input IN1 of dyadic look-up table 10 is I1 and data inputted to the second input IN2 is I2, an operational result $f_1(I1,I2)$ based on a prescribed function $f_1$ is stored as data at an address $[I1I2]$. Further, assuming that image data input to the first input IN1 of dyadic look-up table 20 is I1' and data input to the second input IN2 is I2', an operational result $f_2(I1',I2')$ based on a prescribed function $f_2$ is stored data at an address $[I1'I2']$.

When the data I1, I2 are applied to the first and second inputs, respectively, of both memories 10 and 20 the dyadic look-up tables 10, 20 output data, with data $f_1(I1,I2)$, $f_2(I1,I2)$ stored in the corresponding addresses $[I1I2]$ serving as operational results O1, O2, respectively, so that an operation may be performed between the images.

The input sides of the dyadic look-up tables 10, 20 are connected to the output sides of image memories 40, 50, and it is arranged so that image data I1 of one of the two images are delivered to the first input IN1 and image data I2 of the other image are delivered to the second input IN2.

The output sides of the two dyadic look-up tables 10, 20 are connected to an image arithmetic unit (APU) 30. When the data O1 from the dyadic look-up table 10 and the data O2 from the dyadic look-up table 20 are inputted thereto, the image arithmetic unit 30 executes an operation based on a prescribed function g.

The result O of the operation is delivered to e.g. an image processor 60 connected to the output side of the arithmetic unit.

In FIG. 1, the output O1 of the dyadic look-up table 10 is transferred to an image memory or temporary storage area when necessary. It is arranged so that the output O1 can be made into a new image or so that the output O1 can be utilized as an intermediate operational result required for certain image processing.

When it is desired to perform an operation, e.g. $I1^2 - I2^2$, between two images using the image processing apparatus of the invention, data based on $f_1 = I1 + I2$, $f_2 = I1 - I2$ are stored beforehand at the address $[I1I2]$ of the dyadic look-up tables 10, 20, respectively, and it is arranged so that the operation $g = O1 \times O2$ can be executed by the image arithmetic unit 30.

When the image data I1, I2 related to the two images are read out of the image memories 40, 50 and input to the dyadic look-up tables 10, 20, the dyadic look-up table 10 uses the concatenated values of I1 and I2 as an address input, reads out data I1+I2 stored at the address $[I1I2]$ and outputs the data as O1.

At the same time, the dyadic look-up table 20 uses the concatenated values of I1 and I2 as an address input, reads out data I1−I2 stored at the address $[I1I2]$ and outputs the data as O2.

The data O1, O2 are immediately inputted to the image arithmetic unit 30, which is connected to the output sides of the look-up tables, where the data are multiplied together. The result O1×O2 of the multiplication, namely $I1^2 - I2^2$, is output to the externally located image processor 60.

Accordingly, the operation $g(f_1(I1,I2), f_2(I1,I2))$ is executed by a single manipulation with regard to the two items of image data I1, I2, as mentioned above. A memory for temporarily storing intermediate calculation values is unnecessary.

In accordance with the image processing apparatus according to the invention, as described above, processing can be executed through a small number of cycles even if the functional calculation among a plurality of images is complicated. This makes possible a marked rise in image processing speed.

We claim:

1. An image processing apparatus for executing operations upon a plurality of images, said apparatus comprising:

first image memory means for providing first image data I1;

second image memory means for providing second image data I2;

first dyadic look-up table means, operatively connected to receive the first image data I1 and the second image data I2, for storing sum data corresponding to I1+I2 at an address I1I2 and for providing the stored sum data as first output data in response to receiving the first and second image data I1 and I2;

second dyadic look-up table means, operatively connected to receive the first and second image data I1 and I2, for storing difference data corresponding to I1−I2 at an address I1I2, and for providing the stored difference data as second output data in response to receiving the first and second image data I1 and I2; and arithmetic means, operatively connected to said first and second dyadic look-up table means, for receiving said first and second output data, for performing $(I1^2 - I2^2)$ in response to receiving the first and second output data and for providing an output corresponding to $(I1^2 - I2^2)$.

2. An image processing apparatus comprising:

first and second image memories for producing image data;

first and second dyadic look-up table memories both connected to said first and second image memories for producing a subtraction function output and an addition function output in response to said image data; and an arithmetic unit connected to said first and second dyadic look-up table memories for producing a multiply function output in response to said subtraction and addition outputs.

* * * * *